US005624106A

United States Patent [19]

Weber

[11] Patent Number: 5,624,106

[45] Date of Patent: Apr. 29, 1997

[54] GRIPPING DEVICE

[76] Inventor: Gene Weber, 5373 E. Lowe, Fresno, Calif. 93727

[21] Appl. No.: 555,869

[22] Filed: Nov. 13, 1995

[51] Int. Cl.[6] .................................... B23Q 3/02

[52] U.S. Cl. .................... 269/138; 269/234; 411/354; 411/393

[58] Field of Search .................... 269/134, 137, 269/138, 141, 165, 166, 203, 204, 99, 101, 229, 234, 235, 254 R, 257; 411/191, 192, 354, 393, 531, 537, 539

[56] References Cited

U.S. PATENT DOCUMENTS

| | | | |
|---|---|---|---|
| 2,430,613 | 11/1947 | Hodge | 269/138 |
| 2,587,025 | 2/1952 | Beck et al. . | |
| 2,637,249 | 5/1953 | Swenson . | |
| 3,408,924 | 11/1968 | Mueller | 269/138 |
| 3,473,420 | 10/1969 | Boggs | 269/235 |
| 3,506,253 | 4/1970 | Swenson . | |
| 4,805,888 | 2/1989 | Bishop . | |
| 4,915,367 | 4/1990 | Carossino . | |
| 5,129,637 | 7/1992 | Ito et al. . | |
| 5,310,299 | 5/1994 | Bernstein . | |

*Primary Examiner*—Robert C. Watson
*Assistant Examiner*—Thomas W. Lynch
*Attorney, Agent, or Firm*—Merek & Voorhees

[57] ABSTRACT

A gripping device for holding a workpiece includes a fixture with a working surface and least one hole, a stop rising above the working surface, a fastener and a gripping member. The gripping member has a through bore for receiving the fastener and a gripper wall adapted to engage the workpiece whereby the gripper member slides toward the stop and the gripper wall applies a downward inward holding force on the workpiece when the fastener is secured to the hole of the fixture.

12 Claims, 2 Drawing Sheets

GRIPPING DEVICE

FIELD OF THE INVENTION

The invention relates, in general, to machine tools, and, more particularly, to devices for holding a workpiece on the supporting surfaces of cutting machines, especially for use in repetitive production.

BACKGROUND OF THE INVENTION

Many mechanical operations require that one or more workpieces be held stationary for a period of time. Various types of clamps and other devices are known in the art for securing a workpiece in a desired position to facilitate an operation on the workpiece.

An apparatus for securing one or more workpieces is disclosed in U.S. Pat. No. 4,805,888 to Bishop. The Bishop patent describes a two-piece adjustable clamp where the bolt-like portion of each clamp has a lower end threaded into a cooperating tapped hole of a platen, and has an eccentrically-offset upper end about which a shallow nut-like portion is socketed for orbital camming movements. Thus, Bishop's nut-like portion has vertical walls which hold a workpiece laterally when the bolt-like portion is fastened to the platen.

Another apparatus for securely holding a workpiece is described in U.S. Pat. No. 5,310,299 to Bernstein. The Bernstein patent describes a clamping member having a concentric conical bore for receiving a fastener therethrough which when turned engages against the inner bearing surface of the conical bore providing a lateral force which urges the clamping member toward a workpiece and against a stop. However, the clamping surface of Bernstein's clamping member is also vertical.

Accordingly, both clamping devices described by Bishop and Bernstein solely produce a lateral or horizontal force for securing a workpiece against a stop on a platen which is inadequate for securing a workpiece during machining. Consequently, these clamps and other known clamping devices have failed to secure workpieces when a cutting machine is removed from the workpiece. That is, when a cutting machine such as a drill or slitting saw is inserted into the workpiece there is usually no problem as the horizontal or lateral force holds the workpiece; but, when the drill or slitting saw is removed, the workpiece pops or jumps out of the clamp.

Furthermore, in addition to the downtime caused by the workpiece or several workpieces jumping out of the clamp, the jolt which causes the workpieces to pop out also causes damage to the clamp. Thus, considerable time and money are lost in replacing the workpieces and the clamps due to this inferior design.

SUMMARY OF THE INVENTION

The present invention overcomes this problem by providing a device having a fixture with a working surface and at least one hole, a stop rising above the working surface, a fastener, a gripping member having a through bore for receiving the fastener and a gripper wall adapted to engage a workpiece whereby the gripping member slides toward the stop and the gripper wall applies a downward inward holding force on a workpiece when the fastener is secured to the at least one hole of the fixture.

Accordingly, it is an object of the present invention to provide a device for holding a workpiece in position while the workpiece is being worked on by a machine.

The holding force of the invention may be achieved by a gripper wall having an upper and lower portion where the upper portion applies the holding force.

It is a further object of the invention to have a gripper wall which is tapered from the upper portion to the lower portion where the tapered gripper wall provides the holding force of the invention.

It is yet another object of the invention to provide a gripping member with a through bore having a conical surface where one side is more recessed than the other and the fastener bears against the shallow conical surface thereby creating the downward inward holding force.

It is still a further object of the present invention to provide a device wherein the fastener includes a tapered head and the gripping member further includes a countersink having first and second conical surfaces the first conical surface being in axial alignment with, the through bore and the second conical surface having an axis offset from that of the through bore whereby the tapered head of the fastener bears against the countersink when the fastener is secured to the fixture thereby creating the downward inward holding force.

According to the present invention, a gripping member is provided for holding a workpiece on a fixture which includes a through bore for receiving a fastener and a gripper wall having upper and lower edges, the gripper wall is tapered inwardly from the upper edge to the lower edge whereby the gripper wall applies a downward inward force on a workpiece when a fastener secures the gripping member to a fixture.

The invention will become more fully apparent from the claims and the description as we proceed in connection with the drawings.

DETAILED DESCRIPTION OF THE PREFERRED EMBODIMENT

Figure 1:
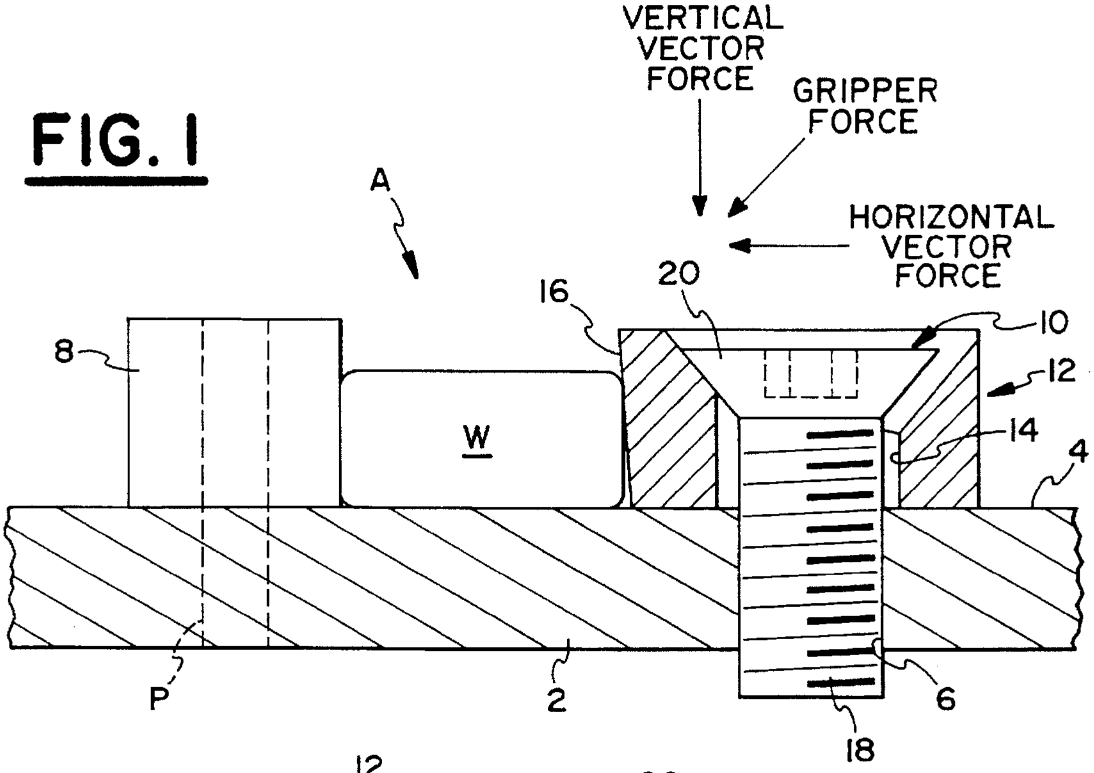
FIG. 1 is a side view, partially in cross-section, of a gripping device for holding a workpiece according to an embodiment of the present invention.

Referring to FIG. 1, there is shown a gripping device A for holding a workpiece in position according to an embodiment of the invention.

Gripping device A includes a fixture 2 having a working surface 4 and at least one hole 6; a stop 8 rising above working surface 4 of fixture 2; a fastener 10 and a gripping member 12. Gripping member 12 has a through bore 14 for receiving fastener 10 and a gripper wall 16 adapted to engage workpiece W.

Fastener 10 may be a standard flat-head bolt formed with a threaded shaft 18 and a tapered head 20. When fastener 10 is secured to hole 6 of fixture 2, either by being received in a threaded hole 6 or a threaded nut (not shown) on the reverse side of fixture 2, gripping member 12 slides toward stop 8 and gripper wall 16 applies a downward inward holding force on workpiece W. This holding force begins where the workpiece W abuts gripper wall 16 and arcs downward through workpiece W to working surface 4 of fixture 2 thereby pushing workpiece W in towards stop 8 and down against working surface 4.

Figure 2:
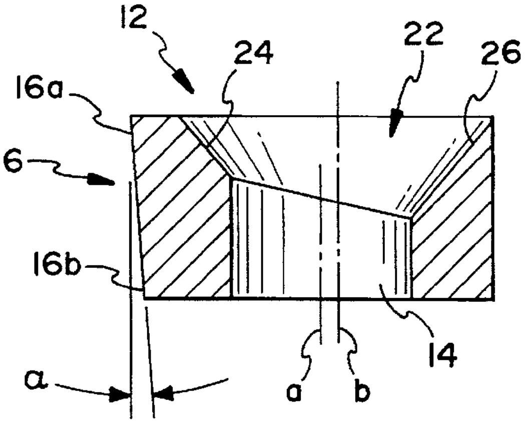
FIG. 2 is a cross-section view of a gripping member according to the invention.

The downward inward holding force can be created by a draft angle α formed on gripper wall 16 as clearly shown in FIG. 2. In this embodiment, gripper wall 16 is tapered from an upper portion 16*a* to a lower portion 16*b* forming draft angle α which is inward from a vertical line. Draft angle α is greater than 0° to approximately 3°, preferably 1.5° pending work being held. The tapered gripper wall pushes against workpiece W with the force created by fastener 10 and locks workpiece W in place. The tapered gripper wall of the invention is capable of locking a round rod during machining operations.

Instead of a draft angle, upper portion 16*a* of gripper wall 16 may apply the holding force on a workpiece. In such an embodiment, the gripper wall 16 may be configured in a manner (e.g., recess) such that lower portion 16*b* would be a distance from the secured workpiece W in the holding position. Further, the bottom wall of gripper member 12 may be tapered upwardly in the direction of the workpiece to achieve similar resulting forces.

Gripper member 12 further includes a countersink 22 having a shallow conical surface 24 and a more recessed conical surface 26. Both countersinks 24, 26 are preferably formed as standard 82° countersinks. However, shallow conical surface 24 is in axial alignment with through bore 14 and more recessed conical surface 26 has an axis offset from that of through bore 14. That is, both through bore 14 and shallow conical surface 24 are formed about axis a; while more recessed conical surface 26 is formed about axis b as shown in FIG. 2.

Accordingly, when fastener 10 is received through gripping member 12 its tapered head 20 bears against shallow conical surface 24 forming a resultant gripper force when fastener 10 is secured to the fixture 2. That is, as shown in FIG. 1, tapered head 20 bears against the tapered shallow conical surface 24 thereby providing a resultant gripper force formed of a horizontal vector three and a vertical vector force. The horizontal vector force causes gripping member 12 to slide across working surface 4 of fixture 2 to hold workpiece W against stop 8 while the vertical vector force securely holds gripping member 12 against fixture 2.

Thus, fastener 10 pushes workpiece W in toward stop 8 and downward toward fixture 2 with the unique resultant gripper force created by gripper wall 16 and the bearing surface of shallow conical surface 24. Tapered gripper wall 16 pushes workpiece W down and against stop 8 locking it in place during a machine operation such that when a machine is removed from the workpiece, even though workpiece W may pop, it catches an edge of upper portion 16*a* of gripper member 12. Thus, workpiece W remains in its secured position during all machining operations.

Figure 3:
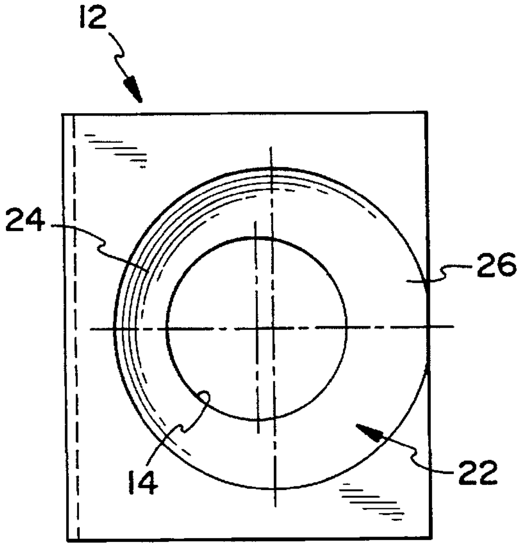
FIG. 3 is a top view of the gripping member shown in FIG. 2.
Figure 5:
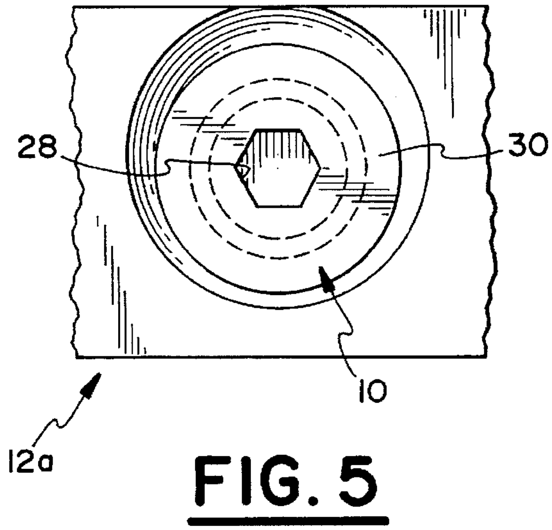
FIG. 5 is a top view of a gripping member with a fastener screwed therein with portions broken away.

A top view of gripper member 12 is shown in FIGS. 3 and 5 which clearly show the offset countersink 22. With this design, a fastener 10 when engaged with shallow conical surface 24 develops the necessary pressure to secure the workpiece W to fixture 2 during all machine operations. A recess 28 is provided in a surface 30 of tapered head 20 of fastener 10. Recess 28 may be six sided for receiving an Allen wrench, a slit or a cross for receiving a standard or Phillips screwdriver head. The tool engaging recess 28 then applies the pressure for securing fastener 10 to fixture 2 as described above.

Countersink 22 is designed with an offset such that when fastener 10 is released from its hole by a half turn of an Allen wrench or the like, tapered head 20 no longer bears against the shallow conical surface of gripper member 12 and in fact, still rests within countersink 22. In order to provide such a function, the more recessed conical surface 26 of countersink 22 is offset approximately 50 to 70 thousandths of an inch from the through bore's axis a. Accordingly, when fastener 10 is loosened, gripping member 12 recedes from workpiece W the 50 to 70 thousandths of an inch thereby enabling the part (workpiece W) to be removed and another part to be inserted in its place.

Figure 4:
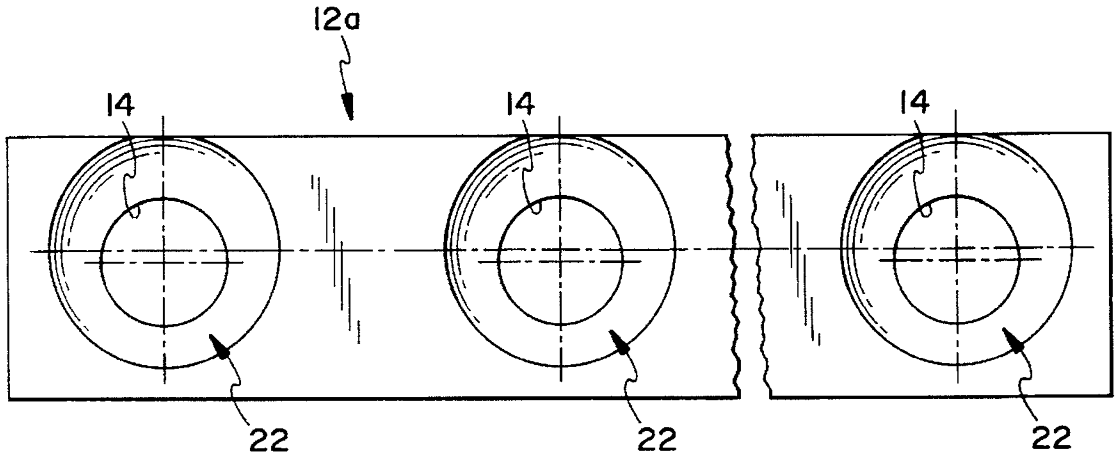
FIG. 4 is a top view of another embodiment of a gripper member having plural through bores with a portion broken away.

As shown in FIG. 4, a gripper member 12*a* having a plurality of through bores 14 and countersinks 22 can be used for larger workpieces and/or of different lengths.

Fixture 2 can be constructed of either steel, brass or aluminum, preferably steel. If fixture 2 is manufactured from aluminum and if a threaded hole 6 is desired such a hole should be reinforced with either a steel or brass threaded core. Fixture 2 is designed for attachment to a machine which enables workpieces held on fixture 2 to be cut (either drilled or sawed, etc.).

Stop 8 may be a steel block which is pinned to fixture 2 via pin P. In other embodiments, stop 8 may be a shoulder on the fixture of any height to provide the backstop for the workpiece so that gripping member 12 forces workpiece W there against.

Gripping member 12 may preferably be manufactured out of aluminum, brass or steel depending upon the material desired. A locking capability of gripping member 12 according to the invention is plus or minus 20 thousandths of an inch. Thus, the tolerance of the gripper member according to the invention is much less than those required by known prior art devices.

The locking feature of gripping member 12 is available for workpieces or pangs of any size, shape or material. For example, a gripping member 12 can be manufactured with a through bore 14 small enough to receive a No. 4–40 thread to a 1" National Fine (NF) or National Coarse (NC) standard 82° socket flat head screw or possibly larger pending work being held.

Accordingly, a gripper member 12 can be manufactured to secure pangs as small as microchips or as large as cylindrical parts for vehicles. Depending on the part or workpiece to be secured, the height of stop 8 varies.

While the invention has been described with reference to a preferred embodiment thereof, it is to be understood that modifications or variations may be easily made without departing from the scope of the present invention which is defined by the appended claims.

What is claimed is:

1. A gripping device for holding a workpiece comprising:

a) a fixture having a working surface and at least one hole;

b) a stop rising above said working surface;

c) a fastener;

d) a gripping member having a through bore for receiving said fastener and a gripper wall adapted to engage a workpiece;

e) said through bore comprises a conical surface, one side of which is more recessed than the other; and f) whereby said gripping member slides toward said stop and said gripper wall applies a downward inward holding force on a workpiece when said fastener bears against said other conical side thereby creating the downward inward holding force and securing the fastener to said at least one hole of said fixture.

2. The device as set forth in claim 1 wherein said gripper wall has upper and lower portions and said upper portion applies the holding force on a workpiece.

3. The device as set forth in claim 2 wherein said gripper wall is tapered from said upper portion to said lower portion.

4. The device as set forth in claim 3 wherein said tapered gripper wall is angled inwardly from a vertical line forming an angle with said vertical line, said angle being approximately greater than 0° to approximately 3° pending application.

5. The device as set forth in claim 1 wherein said stop is a block pinned to said working surface of said fixture.

6. The device as set forth in claim 1 wherein:

a) said at least one hole is threaded;

b) said fastener has a threaded shank; and c) whereby said fastener is received in said threaded hole securing said fastener to said fixture.

7. A device for holding a workpiece on a fixture comprising:

a) a gripping member having a through bore for receiving a fastener;

b) a countersink having first and second conical surfaces;

c) said first conical surface being in axial alignment with said through bore and said second conical surface having an axis offset from that of said through bore;

d) said gripping member having a gripper wall having upper and lower edges, said gripper wall being tapered from said upper edge to said lower edge; and e) whereby said gripper wall applies a downward inward force on a workpiece when a fastener secures said gripping member to a fixture.

8. A device as set forth in claim 7 wherein said tapered gripper wall is angled inwardly from a vertical line forming an angle with said vertical , said angle being approximately greater than 0° to approximately 3° pending application.

9. A device as set forth in claim 7 wherein said second conical surface is more recessed than said first conical surface.

10. A gripping device for holding a workpiece comprising:

a) a fixture having a working surface and at least one hole;

b) a stop rising above said working surface;

c) a fastener including a tapered head;

d) a gripping member having a through bore for receiving said fastener and a gripper wall adapted to engage a workpiece;

e) said gripper member further includes a countersink having first and second conical surfaces;

f) said first conical surface being in axial alignment with said through bore and said second conical surface having an axis offset from that of said through bore; and g) whereby said gripper member slides toward said stop and said gripper wall applies a downward inward holding force on a workpiece when said tapered head of said fastener bears against said countersink thereby creating the downward inward holding force and securing the fastener to said at least one hole of said fixture.

11. The device as set forth in claim 10 wherein said second conical surface is more recessed than said first conical surface, said tapered head of said fastener bearing against said first conical surface to create the holding force.

12. The device as set forth in claim 10 wherein said fastener further includes a recess in a surface of said tapered head, said recess being engageable with a tool for turning said fastener.

* * * * *